United States Patent
Siragusa

[19]

[11] Patent Number: 6,140,610
[45] Date of Patent: Oct. 31, 2000

[54] LOW PROFILE CARPET SEAMING IRON WITH REPLACEABLE HANDLE AND SOLE PLATE OF VARYING THICKNESS

[76] Inventor: Michael A. Siragusa, 3583 Plum Trail, Kennesaw, Ga. 30152

[21] Appl. No.: 09/386,249

[22] Filed: Aug. 31, 1999

[51] Int. Cl.⁷ .............................. D06F 75/24; D06F 75/08
[52] U.S. Cl. .......................... 219/245; 219/228; 156/579; 38/88; 38/92
[58] Field of Search .................................. 219/251, 245, 219/254, 258, 227–229, 231, 249; 156/579; 38/74, 81, 88, 92–93, 95; D32/69

[56] References Cited

U.S. PATENT DOCUMENTS

| | | | |
|---|---|---|---|
| D. 259,463 | 6/1981 | Szymanski | D32/69 |
| 1,816,113 | 7/1931 | Feld | 219/228 |
| 2,162,918 | 6/1939 | Marvin | 219/245 |
| 2,214,084 | 9/1940 | Lovice | 219/228 |
| 2,292,700 | 8/1942 | Kennedy | 219/228 |
| 2,408,750 | 10/1946 | Bolte | 219/251 |
| 2,700,096 | 1/1955 | Clements | 219/228 |
| 2,768,272 | 10/1956 | Lesher | 219/228 |
| 3,523,176 | 8/1970 | Hill | 156/579 |
| 3,582,436 | 6/1971 | Bucher | 219/245 |
| 3,927,298 | 12/1975 | Prater | 219/245 |
| 5,028,295 | 7/1991 | Cracchiolo | 156/579 |
| 5,294,284 | 3/1994 | Papulski | 156/579 |

*Primary Examiner*—John A. Jeffery
*Attorney, Agent, or Firm*—Eric R. Katz

[57] ABSTRACT

A seaming iron is disclosed for use in carpet repairs requiring a replacement patching plug to be fitted into a cut-out opening in a carpet and attached to carpet surrounding the cut-out opening by hot-melt adhesive seaming tape positioned under the carpet and around a periphery of the cut-out opening. The seaming iron comprises: a heated base member sized and shaped for insertion into the cut-out opening to enable sufficient maneuverability of the seaming iron within the cut-out opening to permit direct contact between the heated base member and all of the seaming tape to activate hot-melt adhesive thereon and for preventing the seaming iron from becoming caught in the cut-out opening as the patching plug is attached to the surrounding carpet; a heat shield at an upper surface of the base member; a sole plate at a bottom surface of the base member for contacting and heating the hot-melt adhesive tape used to attache the patching plug to the carpet surrounding the cut-out opening in the carpet; a heater core located adjacent to the sole plate for heating the sole plate; and a handle having an elongated shaft and a pistol grip at a distal end of the shaft.

15 Claims, 6 Drawing Sheets

LOW PROFILE CARPET SEAMING IRON WITH REPLACEABLE HANDLE AND SOLE PLATE OF VARYING THICKNESS

BACKGROUND OF THE INVENTION

1. Field of the Invention

The present invention generally relates to a carpet seaming iron, and more particularly, to a carpet seaming iron particularly adapted for use in carpet repairs wherein a replacement patching plug is fitted into a relatively small cut-out opening in a carpet.

2. Background Discussion

Carpeting is probably the most commonly used type of floor covering employed for a wide range of purposes including commercial designs, industrial facilities and residential structures. After extended use, small sections of carpet are often damaged by burns, tears, rips and the like and have to be repaired or the entire carpet replaced.

Since the damaged areas of carpets are usually confined to relatively small cross-sectional areas, it is often feasible to cut-out the damaged area and to make a patch with a patching plug that is cut to fit the cut-out opening. In order to retain a satisfactory appearance of the carpet, the damaged area must be cut-out with precision and a precisely matched patching plug must be fitted within the opening cut-out in the original carpet.

Figure 1A:
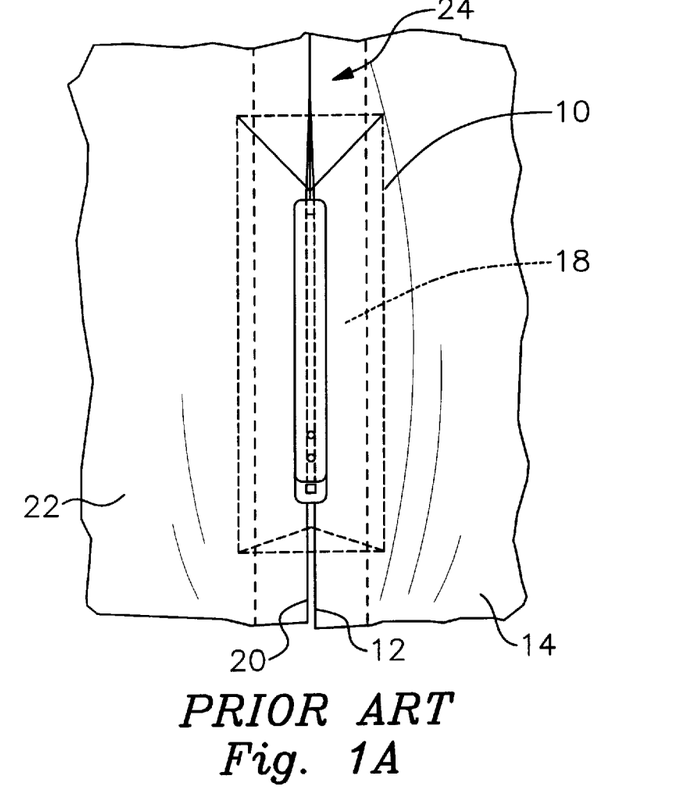
FIG. 1A is a top, partial view of a conventional seaming iron being used to repair a carpet wherein a carpet replacement patching plug is secured in a cut-out opening in the carpet.
Figure 1B:
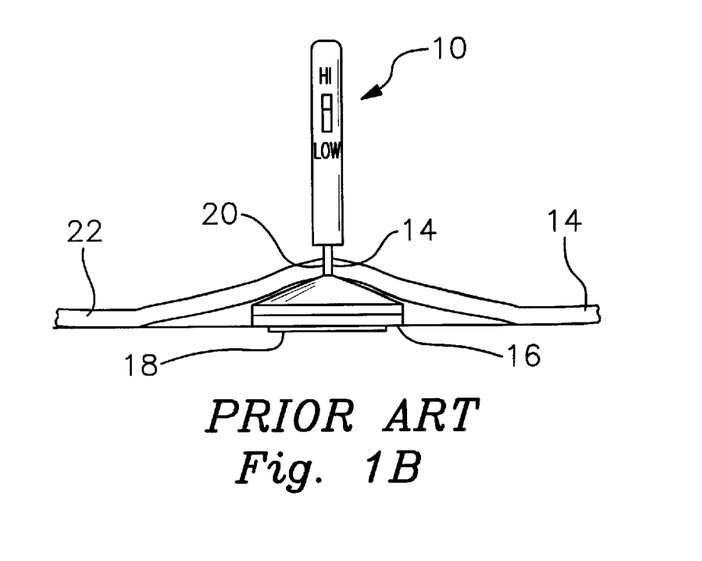
FIG. 1B is a front, sectional view of FIG. 1A.

The bottom surface of the patching plug is preferably secured in place to the bottom surface of the surrounding carpet using a hot-melt adhesive seaming tape coated with a heat activated adhesive that is typically actuated using a hot seaming iron. To obtain good adhesion, it is important to heat all of the seaming tape. However, known seaming irons, such as seen in FIGS. 1A and 1B, are relatively wide and large (for example, from 3 to 6 inches wide and 8 to 12 inches long) and rectangular in shape, such as disclosed by U.S. Pat. No. 5,028,295 to Cracchiolo, and cannot be easily inserted, if at all, into the comparatively small opening of the cut-out in the original carpet in order to directly contact the heat activated adhesive on the seaming tape. Also, the size and shape of conventional seaming irons make it difficult to: 1) move the seaming iron within the cut-out opening without the seaming iron becoming hung-up in or caught on the edges of the cut-out opening and 2) remove the seaming iron from the cut-out opening upon completion of the repair without getting hot-melt adhesive on the carpet.

More specifically and referring to FIGS. 1A–1B, when the cut-out opening is large enough, the standard size seaming iron, generally indicated at 10, is inserted into the cut-out opening and under the edge 12 of the surrounding carpet 14. The heated surface 16 of the seaming iron 10 is applied directly to the seaming tape 18 positioned beneath the carpet 14 around the entire periphery 20 of the cut-out and the patching plug 22 is inserted into the cut-out so as to overlie the seaming iron 10. The seaming iron 10 is then moved along each length of the carpet seaming tape 18 at the seam 24 formed between the plug 22 and the carpet 14 to activate the hot-melt adhesive and attach the patching plug 22 to the carpet 14.

Due to the relatively large length and width of the conventional seaming iron 10, as compared to the size of the cut-out opening, it is difficult to maneuver the seaming iron 10 within the cut-out and along each side of the cut-out so as to properly contact the seaming tape 18 and activate the hot-melt adhesive thereon. In addition, it is important that the patching plug 22 lay flat with the carpet 14 at the seam 24.

In addition, due to the difficulty of moving the relatively larger iron 10 within the comparatively small cut-out opening, it is quite possible for one side of the patching plug 22 to become securely glued to the surrounding carpet 14 before all of the seaming tape 18 has been activated, thus making it very difficult to remove the seaming iron 10 from the cut-out. Moreover, due to the difficulty in removing the seaming iron 10 from the cut-out after completion of the repair, hot-melt adhesive on the bottom of the seaming iron 10 can be inadvertently applied to the carpet upon removal of the seaming iron 10 from the cut-out opening, thereby ruining the entire repair and necessitating re-performance of the entire procedure.

When the cut-out opening is not large enough to permit the insertion of a known carpet seaming iron, the carpet repairs must be performed by placing short lengths of hot-melt adhesive seaming tape around the periphery of the opening in the carpet and latex or hot melt adhesive must be applied directly to the tape by hand, for example, using a hot-glue gun or the like, to secure the patch to the surrounding carpet. This method is not only awkward and time consuming, but because adhesive is being applied over the heat activated adhesive on the seaming tape, the bond so formed is not the best that it could be.

SUMMARY OF THE INVENTION

Accordingly, it is an object of the present invention to provide a carpet seaming iron adapted for use within a relatively small cut-out opening provided in a carpet for receiving a patching plug used to replace a damaged area of the carpet.

It is a further object of the present invention to provide a carpet seaming iron having a heated base member sized and shaped to provide sufficient maneuverability to directly contact all of the hot-melt adhesive seaming tape placed around the periphery of a relatively small cut-out opening provided in a carpet for receiving a replacement patching plug.

Yet another object of the present invention is to provide a carpet seaming iron which greatly reduces the time and effort required to patch a carpet.

One particularly advantageous feature of the present invention is that it eliminates the awkward and time consuming need to apply a latex or hot melt adhesive by hand in order to attach a replacement patching plug to the surrounding carpet when the cut-out opening is too small to permit the use of a conventional seaming iron.

Yet another advantageous feature of the present invention is that it provides a superior bond of the patching plug to the surrounding carpet then achieved heretofore.

Still a further advantageous feature of the present invention is the ability to easily replace the heated base member with different shaped base members, each particularly adapted to the requirements of the repair. In this regard, a patching plug located at or near a wall or the like is more difficult to glue into place due to the obstruction caused by the wall thereby restricting maneuverability of the seaming iron within the cut-out opening. Therefore, the seaming iron of the present invention permits the use of a base member having a substantially rectangular shaped heated sole plate as well as a base member having a swept-back, arrow head shaped sole plate, depending on the requirements of the repair.

Thus, the advantageous features of the present invention include: 1) a relatively small heated base member suitably sized and shaped for insertion into the relatively small cut-out in the carpet to permit direct contact between the heated surface of the base member and all of the seaming tape used to bond the carpet patching plug to the surrounding carpet, 2) the elimination of the risk of inadvertently applying melted adhesive from the bottom of the seaming iron to the surrounded carpet upon removal of the seaming iron from the repaired area, 3) the increased maneuverability of the seaming iron of the present invention within the relatively small cut-out opening in the carpet, 4) a heated base member sized and shaped to prevent the seaming iron from becoming caught or hung-up on the edges of the cut-out opening of the carpet, 5) an elongated handle having a relatively narrow elliptical cross-section which allows the carpet patching plug to lay flat at the seam with the surrounding carpet and permits the operator to effectively control the position of the heated base member within the cut-out opening of the carpet, and 6) replaceable base members having different shaped configurations depending on the requirements of the repair, for example, a base member having either a substantially rectangular shape or a swept-back, arrow head-like shape.

These and other objects, advantages and features of the present invention are achieved, according to one embodiment thereof, by a seaming iron for use in carpet repairs requiring a replacement patching plug which is fitted into a cut-out opening in a carpet and attached to carpet surrounding the cut-out opening by hot-melt adhesive seaming tape positioned under the carpet and around a periphery of the cut-out opening, the seaming iron comprising a relatively small heated base member sized and shaped for insertion into the relatively small cut-out opening in the carpet to enable sufficient maneuverability of the seaming iron within the cut-out opening to permit direct contact between the heated base member and all of the seaming tape to activate hot-melt adhesive thereon and for preventing the seaming iron from becoming caught or hung-up in the cut-out opening as the patching plug is attached to the surrounding carpet.

The heated base member includes a heat shield at an upper surface thereof and a heated sole plate at a bottom surface for contacting and heating the hot-melt adhesive on the seaming tape. A heater core is located in the base member and adjacent to the sole plate for heating the sole plate. A handle, having an elongated shaft and a pistol grip, is attached to the base member for controlling the position of the heated base member during the repair. In embodiments of the invention having a replaceable base member, a connector is further included for removably connecting the base member to the elongated handle.

DETAILED DESCRIPTION OF THE PREFERRED EMBODIMENT(S)

Figure 2:
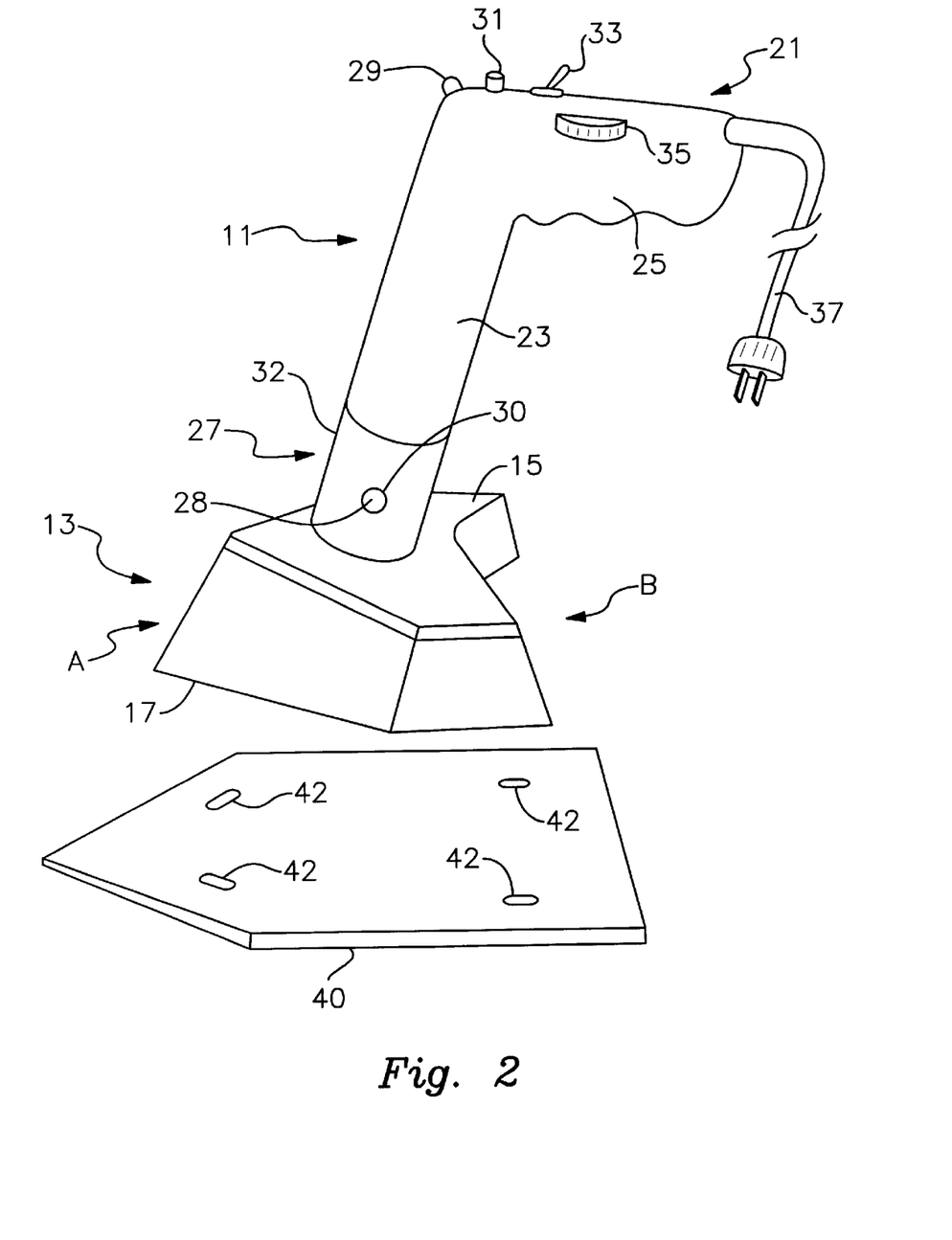
FIG. 2 is a perspective view illustrating one embodiment of the carpet seaming iron of the present invention and a holding tray therefor.

Referring to FIG. 2, a perspective view of one embodiment of a seaming iron of the present invention, generally indicated at 11, is illustrated for use in repairing small sections of carpet damaged by burns, tears, rips and the like. The seaming iron 11 has a heated base member 13 for activating hot-melt adhesive on seaming tape used to affix a replacement patching plug fitted into the cut-out opening in the carpet resulting from the removal of the damaged section of the carpet.

Since repairs of the type described above typically involve replacement of relatively small areas of the carpet, the seaming iron 11 is particularly adapted for use in small cut-out openings, for example, having at least one side which is approximately eight to twelve inches long or less, and/or located at or near an obstruction, such as, for example, a wall. These types of repairs do not permit the full insertion of a conventionally sized and shaped seaming iron into the cut-out opening to directly contact all of the seaming tape.

According to one embodiment of the present invention, the base member 13 is replaceable with base members having different shapes or sizes particularly adapted to the location (near a wall for example), size, or shape of the cut-out opening. It should be understood, however, that the base member 13 can also be permanently affixed so as to be not replaceable.

In all embodiments of the present invention, the base member 13 is sized and shaped for insertion into the relatively small cut-out opening in the carpet to enable sufficient maneuverability of the seaming iron within the cut-out opening and permit direct contact with all of the seaming tape to activate the hot-melt adhesive thereon. In addition, the base member is sized and shaped, depending on the requirements of the repair, to prevent the seaming iron from becoming caught in the cut-out opening as the patching plug is attached to the carpet. Further, the base member 13 preferably has a front portion A which is thicker than the rear portion B to permit the seaming iron 11 to easily glide underneath the carpet without becoming hung-up on the edges of the cut-out opening.

Figure 5:
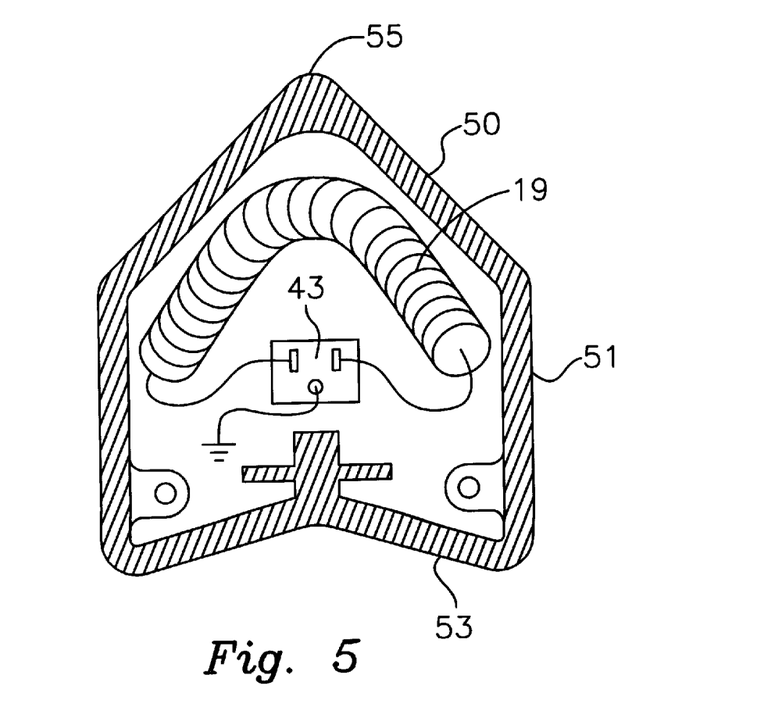
FIG. 5 is a top, sectional view of the bottom cavity of the sole plate of the base member of FIG. 4 illustrating the placement of the electrical heating coil contained therein.

According to the embodiment of the present invention illustrated by FIG. 2, the base member has a swept-back, arrow head-like planar outline and is made of any suitable material, such as, for example, aluminum or cast aluminum and alloys thereof. The base member 13 further includes a heat shield 15 at an upper surface of the base member 13 and a sole plate 17 at a bottom surface of the base member 13 for contacting and heating the hot-melt adhesive on the seaming tape (not shown) positioned under the carpet and around the periphery of the cut-out opening in the carpet. The bottom surface of the sole plate 17 is, for example, continuous, smooth and flat and has a surface area of from a minimum of about four square inches to a maximum of about sixteen square inches, preferably between about five to ten square inches. A heater core 19 (as best seen in FIG. 5) is located within the base member 13 and adjacent to the sole plate 17 for heating the sole plate 17 to a desired temperature.

The base member 13 is removably attached to a handle, generally indicated at 21, which comprises an elongated shaft 23 having a pistol grip 25 at a distal end of the shaft 23. The elongated shaft 23 of the handle 21 slants back toward the rear B of the base member 13 at an angle of from about 70 degrees to about 84.5 degrees. A connector arrangement 27 is provided for removably connecting the elongated handle 21 to the base member 13. The elongated shaft 23 of the handle 21 is, for example, between about 1 ½ to 2 ½ times as long as the length L of the base member 13, preferably about twice as long as the length L.

The connector arrangement 27 includes a pair of spring biased ball bearings 28 positioned on the proximal end of the shaft 23 which snugly engage holes 30 provided in a tubular sleeve 32 affixed to the heat shield 15 of the base member 13. The proximal end of the shaft 23 has a somewhat smaller diameter than the shaft 23 and is adapted to be inserted into the tubular sleeve 32. Once the spring biased ball bearings 28 are aligned with the holes 30 of the tubular sleeve 32, the ball bearings 28 spring into the holes 30 and hold the handle 21 in the tubular sleeve 32 and to the base member 13. The release mechanism for releasing the handle 21 from the base member 13 will be more fully described below with particular reference to FIG. 3B.

Figure 3A:
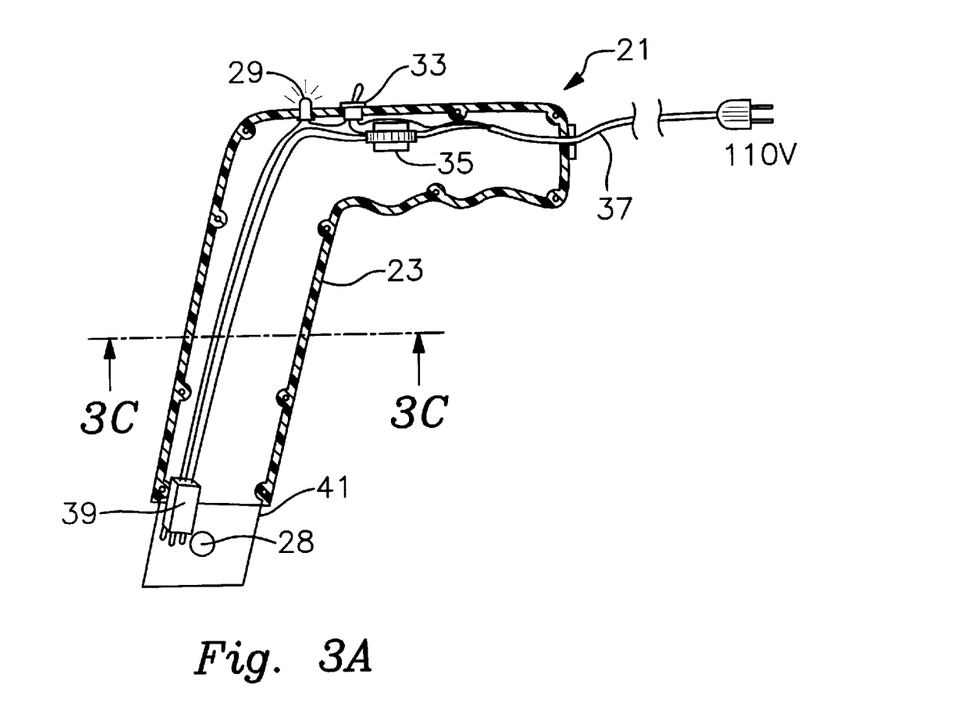
FIG. 3A is a sectional side view of the handle of the carpet seaming iron of FIG. 2 illustrating the electrical wiring therein.
Figure 3B:
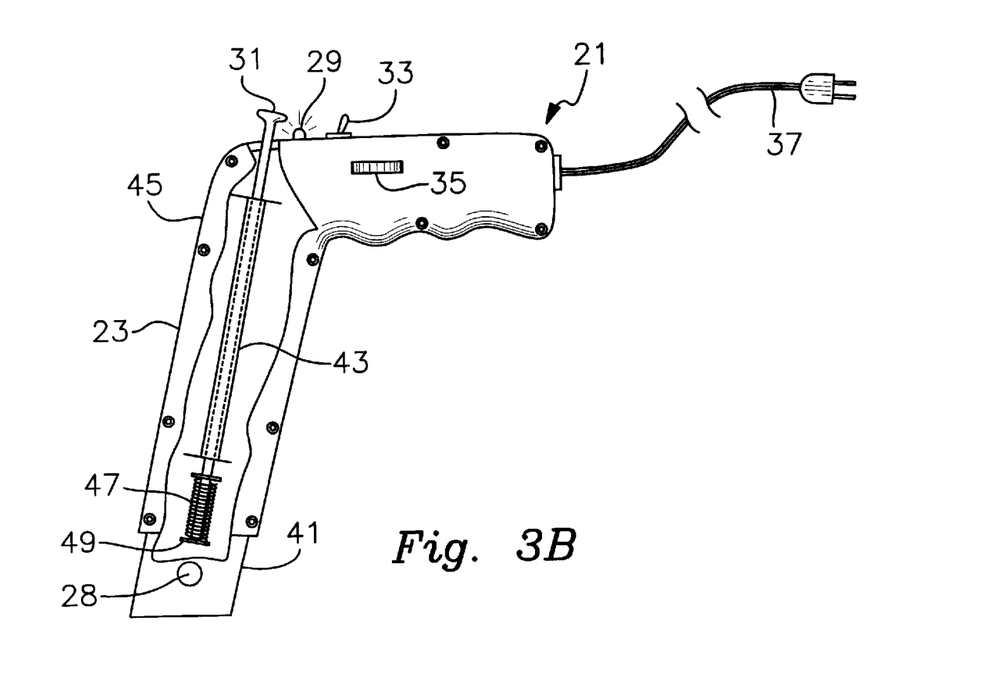
FIG. 3B is a side view, partially-in-section, of the handle of FIG. 3A illustrating the plunger arrangement for releasing the handle from the heated base member.

The handle 21 further includes an on/off light 29 which is lit when the seaming iron 11 is on, a plunger 31 for assisting in the removal of the base member 13 from the handle 21 as will be more fully described with particular reference to FIG. 3B, an on/off switch 33 and a manual thermostat control wheel 35 for manually setting the temperature of the sole plate 17 to a desired sole plate temperature.

The seaming iron 11 is electrically powered and has an electrical power cord and plug 37 for attaching the seaming iron 11 to a standard electrical outlet. Also shown in FIG. 2 is a tray 40 having a plurality of spring clips 42 for engaging and holding the base member 13. The tray 40 is adapted to receive and hold a hot seaming iron without burning the surrounding area.

Figure 4A:
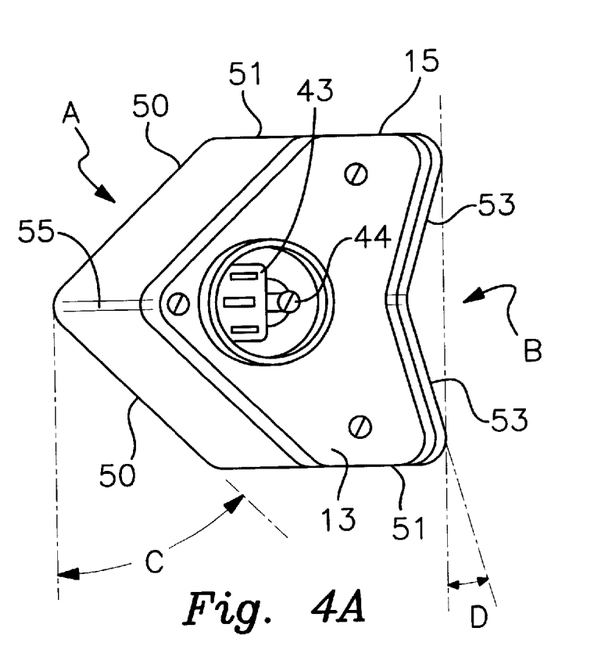
FIGS. 4A, 4B and 4C are, respectively, front, side and top views of one embodiment of the base member of the carpet seaming iron of FIG. 2.

Referring to FIG. 3A, a cross-sectional, side view of the handle 21 illustrates the electrical connection of the on/off light 29, on/off switch 33 and manual thermostat control wheel 35 accomplished by the electrical cord 37. The electrical cord has a further plug 39 at the proximal end 41 of the handle 21 which is plugged into an outlet 43 in the base member 13 (as best seen in FIG. 4A) to connect the heater core 19 to a source of electricity.

Referring to FIG. 3B, a side view of the handle 21, partially-in-section, illustrates the structure of the plunger 31 for assisting in the removal of the base member 13 from the handle 21. The plunger 31 is received by a guide sleeve 43 and is spring biased toward the distal end 45 of the shaft 23 by a spring 47. A plate 49 is provided at the end of the plunger 31 adjacent to the proximal end 41 of the shaft 23.

In operation, the plunger 31 extending out of the handle 21 is pressed downward while the ball bearings 28 are manually pressed inward. As a result of the downward pressure exerted on the plunger 31, the plate 49 pushes against a pin 44, (as best seen in FIG. 4A) provided within the tubular sleeve 32 and attached to the base member 13, to force the base member 13 away from the handle 21 and cause the ball bearings 28 to slide out of the holes 30 thereby disengaging and releasing the base member 13 from the handle 21.

Figure 3C:
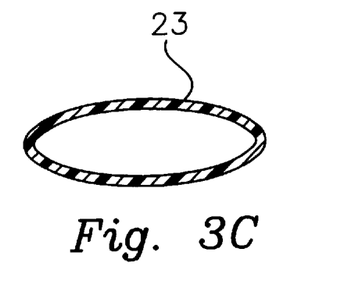
FIG. 3C is cross-sectional view of the handle of FIG. 3A taken along line 3C—3C.

Referring to FIG. 3C, a cross-sectional view of the elongated shaft 23 taken along line 3C—3C is provided to illustrate that the elongated shaft 23 preferably has a narrow and substantially elliptical cross-section to permit the patching plug and surrounding carpet to lay substantially flat next to one another as the seaming iron 11 is moved over the seaming tape along the periphery of the cut-out opening.

Figure 4B:
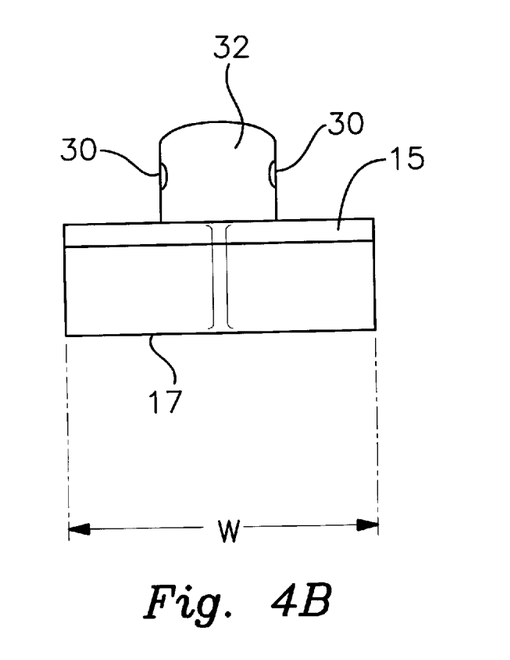
Figure 4C:
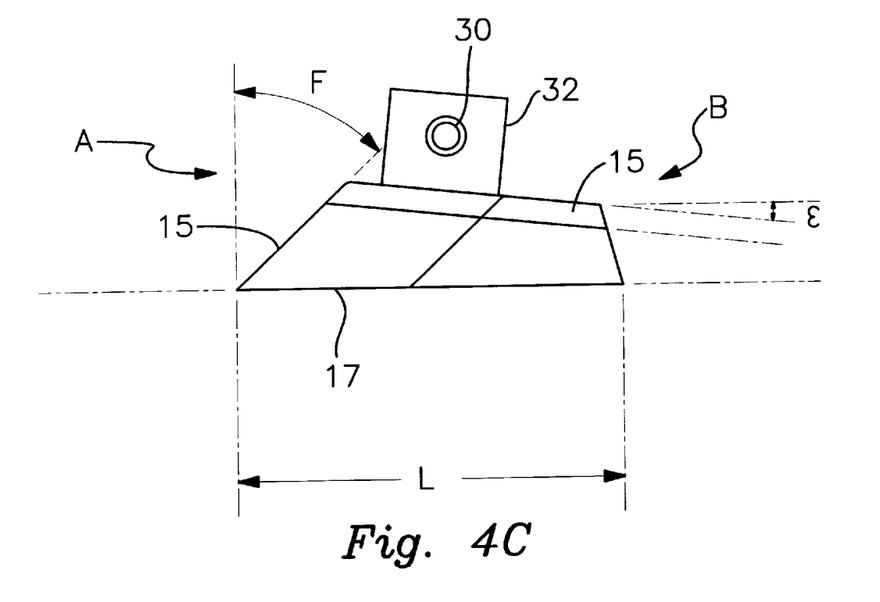

Referring to FIGS. 4A–4C, the configuration and shape of the base member 13 illustrated by FIG. 2 will now be discussed. As best seen in FIG. 4A, the base member 13 has a wedged shape front portion A that is thicker (as best seen in FIG. 4C) than the V-notched rear portion B of the base member 13. More particularly, the base member 13 has a swept-back, arrow head-like shape formed by a pair of swept-back front sides 50 and a pair of substantially parallel lateral sides 51 which connect the front portion A to the V-notched rear portion B formed by a pair of swept-forward rear sides 53.

The angle C of the front sides is, for example, about 45 degrees. The angle D of the forward sweep of the swept-forward rear sides 53 is, for example, about 15 degrees.

As best seen in FIGS. 4B and 4C, a length L of the base member 13 is from about 2.5 to about 4 inches long, preferably about 2.5 inches long and a width W of the base member is from about 2 to about 2.125 inches wide, preferably about 2 inches wide. In addition, as best seen in FIG. 4C, the angle E formed between the heat shield 15 and the sole plate 17 is about 5 to 5.5 degrees so that the front A of the base member 13 is thicker than the rear B of the base member 13. For example, a maximum thickness at the front A of the base member 13 is about 0.750 inches and a minimum thickness at the rear B of the base member 13 is about 0.300 inches.

In addition, the front edge 55 of the front A of the base member 13 extending from the sole plate 17 to the heat shield 15 forms an angle F of, for example, about 45 degrees.

FIG. 5 is a top, sectional view of the interior of the sole plate 17 of the base member 13 illustrating the placement of the electrical heater core 19 contained therein and the connection of the core 19 to the electrical plug 43. As previously noted, the sole plate 17 is preferably made of cast aluminum.

Figure 6A:
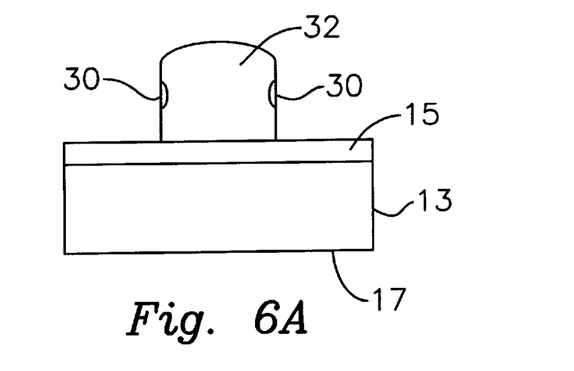
FIGS. 6A, 6B and 6C are, respectively, front, side and top views of another embodiment of the base member.
Figure 6B:
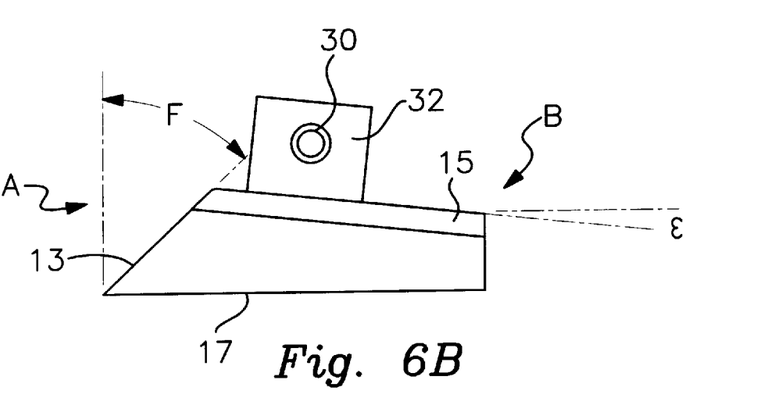
Figure 6C:
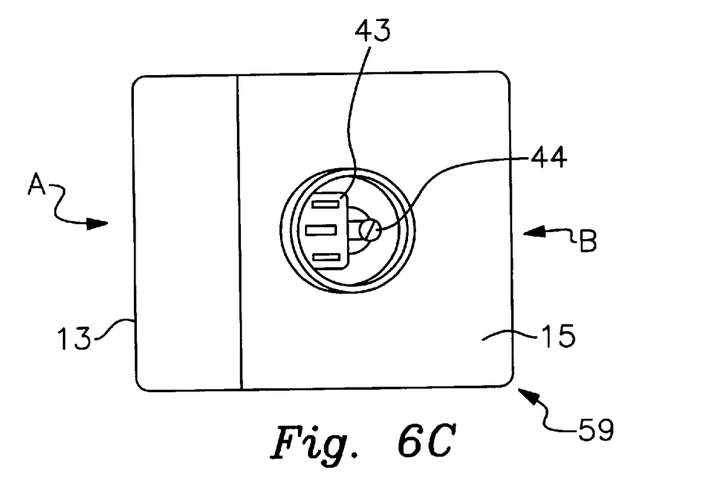

Referring to FIGS. 6A–6C, a further embodiment of the base member 13 is illustrated having a generally rectangular shape with, for example, rounded corners at 59. The overall dimensions of the base member 13 illustrated by FIGS. 6A–6C (L, W, angles E and F) are substantially the same as those of the base member 13 of FIGS. 4A–4C with a maximum thickness at the front A of the base member 13 being about 0.750 inches and a minimum thickness at the rear B of the base member 13 being about 0.300 inches.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A seaming iron for use in carpet repairs requiring a replacement patching plug to be fitted into a relatively small cut-out opening in a carpet, wherein the length of at least one peripheral edge of the cut-out area is less than eight inches, the patching plug being attached to carpet surrounding the cut-out opening by hot-melt adhesive seaming tape positioned under the carpet and around a periphery of the cut-out opening, the seaming iron comprising:

a heated base member sized and shaped for insertion into the cut-out opening to enable sufficient maneuverability of the seaming iron within the cut-out opening to permit direct contact between the heated base member and all of the seaming tape to activate hot-melt adhesive thereon and for preventing the seaming iron from becoming caught in the cut-out opening as the patching plug is attached to the surrounding carpet, wherein the base member has a swept-back, arrow head-like shape and a front portion which is thicker than a rear portion thereof, and wherein a front edge of the base member extending from the sole plate to the heat shield slopes downward from rear to front;

a heat shield at an upper surface of the base member;

a sole plate at a bottom surface of the base member for contacting and heating the hot-melt adhesive tape used to attach the patching plug to the carpet surrounding the cut-out opening in the carpet;

a heater core located adjacent to the sole plate for heating the sole plate; and a handle having an elongated shaft and a pistol grip at a distal end of the shaft.

2. A seaming iron according to claim 1, further including a connector for removably connecting the base member to the handle.

3. A seaming iron according to claim 1, further comprising a thermostat coupled to the heater core for controlling a temperature of the sole plate and a manual control on the handle for setting the thermostat to a desired sole plate temperature.

4. A seaming iron according to claim 1, wherein a length of the base member is from about 2.5 to about 4 inches long and wherein a width of the base member is from about 2 to about 2.125 inches wide.

5. A seaming iron according to claim 1, wherein the heat shield is positioned at about a 5 to 5.5 degree angle relative to the sole plate so that a front portion of the base member is thicker than a rear portion of the base member.

6. A seaming iron according to claim 1, wherein the elongated shaft of the handle slants back toward the rear portion of the base member.

7. A seaming iron according to claim 6, wherein the elongated shaft forms an acute angle with the heat shield of the base member of from about 70 degrees to about 84.5 degrees.

8. A seaming iron according to claim 1, wherein the swept-back, arrow head-like shaped base member has a wedged-shaped front portion formed by a pair of swept-back front sides, and a V-notched rear portion having a pair of swept-forward rear sides.

9. A seaming iron according to claim 1, wherein a width of the base member is about 2 inches, a length of the base member is about 2.5 inches, a maximum thickness at a front of the base member is about 0.750 inches and a minimum thickness at a rear of the base member is about 0.300 inches.

10. A seaming iron according to claim 1, wherein a cross-section of the elongated handle is substantially elliptical to permit the patching plug and surrounding carpet to lay substantially flat next to one another as the seaming iron is moved over the seaming tape along the periphery of the cut-out opening.

11. A seaming iron for use in carpet repairs requiring a replacement patching plug to be fitted into a cut-out opening in a carpet and attached to carpet surrounding the cut-out opening by hot-melt adhesive seaming tape positioned under the carpet and around a periphery of the cut-out opening, wherein the length of at least one peripheral edge of the cut-out area is less than eight inches, the seaming iron comprising:

a replaceable heated base member sized and shaped for insertion into the cut-out opening to enable sufficient maneuverability of the seaming iron within the cut-out opening to permit direct contact between the heated base member and all of the seaming tape to activate the hot-melt adhesive thereon and for preventing the seaming iron from becoming caught in the cut-out opening as the patching plug is attached to the surrounding carpet, the base member having a front portion which is thicker than a rear portion thereof, wherein the replaceable base member has one of a rectangular shape and a swept-back, arrow head-like shape comprising a wedged-shaped front portion formed by a pair of swept-back front sides, a pair of substantially parallel lateral sides which connect the front portion to a V-notched rear portion having a pair of swept-forward rear sides;

a heat shield at an upper surface of the base member;

a sole plate at a bottom surface of the base member for contacting and heating the hot-melt adhesive tape positioned under the carpet and around the periphery of the cut-out opening in the carpet;

a heater core located adjacent to the sole plate for heating the sole plate;

a handle having an elongated shaft and a pistol grip at a distal end of the shaft; and a connector for removably connecting the replaceable base member to the handle.

12. A seaming iron according to claim 11, wherein the sole plate has an area of from about four to about sixteen square inches.

13. A seaming iron according to claim 11, wherein the elongated shaft of the handle slants back toward the rear portion of the base member.

14. A seaming iron for use in carpet repairs requiring a replacement patching plug to be fitted into a relatively small cut-out opening in a carpet, wherein the length of at least one peripheral edge of the cut-out area is less than eight inches, the patching plug being attached to carpet surrounding the cut-out opening by hot-melt adhesive seaming tape positioned under the carpet and around a periphery of the cut-out opening, the seaming iron comprising:

a replaceable heated base member sized and shaped for insertion into the cut-out opening to enable sufficient maneuverability of the seaming iron within the cut-out opening to permit direct contact between the heated base member and all of the seaming tape to activate hot-melt adhesive thereon and for preventing the seaming iron from becoming caught in the cut-out opening as the patching plug is attached to the surrounding carpet, the base member having a front portion that is thicker than a rear portion thereof;

a heat shield at an upper surface of the base member;

a sole plate at a bottom surface of the base member for contacting and heating the hot-melt adhesive tape used to attach the patching plug to the carpet surrounding the cut-out opening in the carpet;

a heater core located adjacent to the sole plate for heating the sole plate;

a handle having an elongated shaft with a proximal end adjacent to the replaceable, heated base member and a pistol grip at a distal end of the shaft; and a connector arrangement for removably connecting the replaceable base member to the handle, the connector arrangement comprising:

a pair of retractable spring biased ball bearings positioned on the proximal end of the shaft for engaging holes provided in a tubular sleeve affixed to the heat shield of the base member; and a plunger for assisting in the removing the base member from the handle, the plunger being received in the handle and being spring biased toward the distal end the shaft by a spring, wherein a part of the plunger extends out of the handle and another end of the plunger is adjacent to the proximal end of the shaft;

wherein, in operation, the part of the plunger extending out of the handle is manually pressed toward the handle while the ball bearings are retracted so that pressure exerted by the plunger on the base member forces the base member away from the handle and causes the ball bearings to slide out of the holes thereby disengaging and releasing the base member from the handle.

15. A seaming iron according to claim 14, wherein the replaceable base member has one of a rectangular shape and a swept-back, arrow head-like shape comprising a wedged-shaped front portion formed by a pair of swept-back front sides, a pair of substantially parallel lateral sides which connect the front portion to a V-notched rear portion having a pair of swept-forward rear sides.

* * * * *